UNITED STATES PATENT OFFICE.

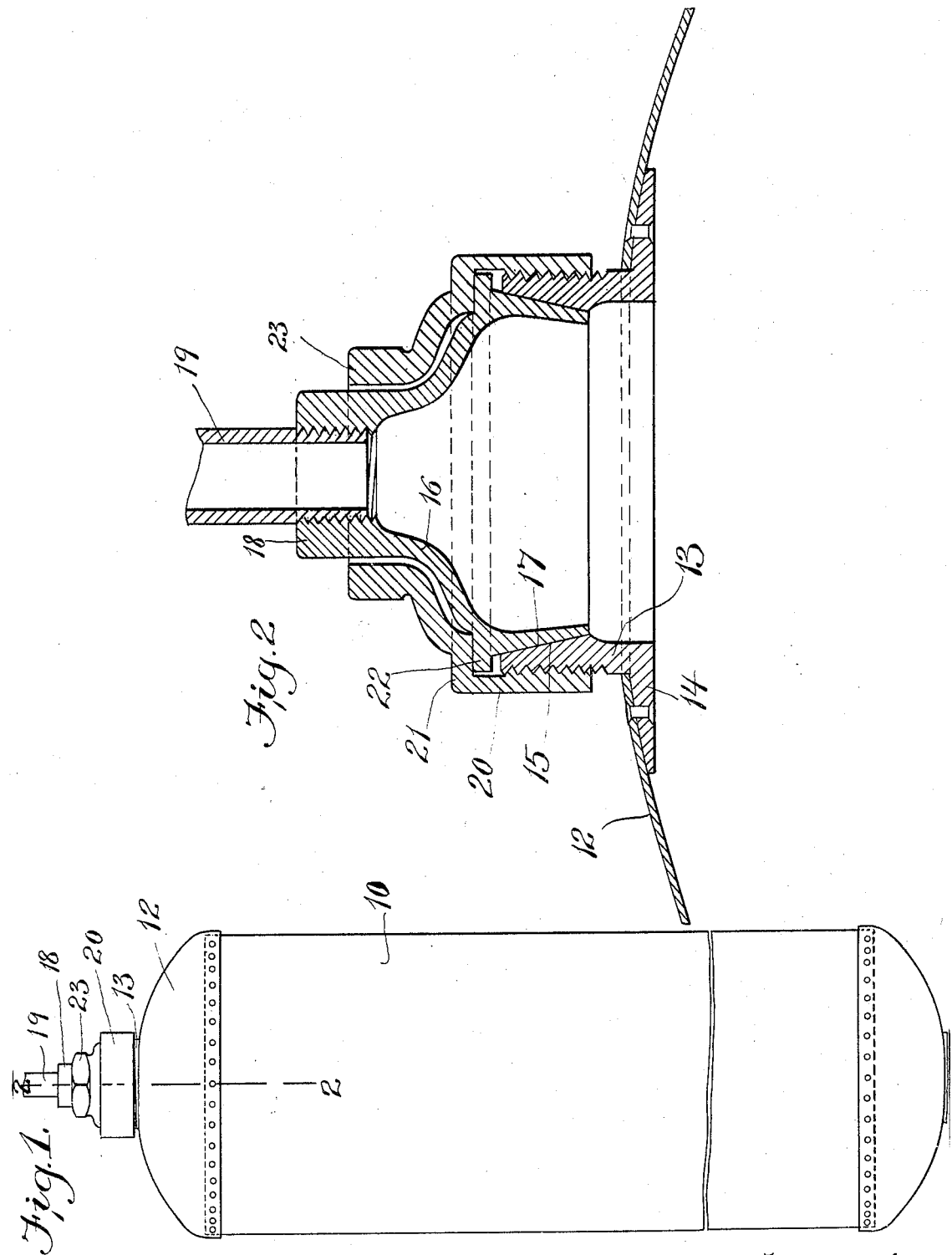

ARTHUR C. BADGER, OF COHASSET, MASSACHUSETTS.

HAND-HOLE PIPE-COUPLING ATTACHMENT FOR BOILER-HEADS, &c.

No. 881,045.  Specification of Letters Patent.  Patented March 3, 1908.

Application filed February 12, 1907. Serial No. 357,105.

*To all whom it may concern:*

Be it known that I, ARTHUR C. BADGER, of Cohasset, in the county of Norfolk and State of Massachusetts, have invented certain new and useful Improvements in Hand-Hole Pipe-Coupling Attachments for Boiler-Heads, &c., of which the following is a specification.

This invention relates to means for connecting a pipe to an end or head of a receptacle, such as a tank or boiler used in connection with a kitchen range for holding a supply of hot water, the receptacle comprising a body portion and heads riveted or otherwise secured thereto. Receptacles of this character are ordinarily made from sheet metal, such as copper. It is very desirable, in order to afford suitable strength of construction at the ends or heads of the receptacle, to apply the heads to the outer surface of the body, the heads overlapping the ends of the body, and being either riveted or soldered thereto.

My invention has for its object to permit such access to the interior of the receptacle as may be required in riveting or soldering one or both of the heads to the body without employing a special hand hole for this purpose.

The invention is embodied in an attachment comprising a hand hole bushing of sufficient size to permit the convenient insertion of the operator's hand and arm, or of a suitable tool, into the receptacle during the riveting or soldering operations, said attachment being also adapted to serve as a means for connecting a sevice pipe to the head.

My invention consists in the improvement which I will now proceed to describe and claim.

Of the accompanying drawings, forming a part of this specification,—Figure 1 represents a side elevation of a range boiler equipped with my improved attachment. Fig. 2 represents a section on line 2—2 of Fig. 1.

The same letters of reference indicate the same parts in all the figures.

In the drawings, 10 represents the sheet metal body, and 12 12 the heads of a range boiler to which my invention is applied. The heads 12 are formed at their margins to overlap the end portions of the body, and are riveted or soldered thereto. To permit such access to the interior of either or both of the heads and the corresponding portion of the body as may be required in riveting or soldering the head to the body, and at the same time provide means for connecting a service pipe with the receptacle, I have produced the improved attachment next described.

13 represents a hand hole bushing, which is a ring adapted to be inserted in an orifice formed in the head, and provided at one end with an external attaching member which is an outwardly-projecting flange 14, adapted to be riveted or otherwise attached to the head, the bushing projecting outwardly from the head, as shown in Fig. 2. The bushing is externally screw-threaded, and is provided on its inner surface with a tapered face 15.

16 represents a conduit section, which is provided at one end with an annular tapered bearing face 17, which closely fits the face 15 of the bushing, said faces 15 and 17 being ground or otherwise finished so that when pressed together they form a tight joint. The end of the conduit section 16, opposite the end having the face 17, is preferably reduced, and is formed as a pipe-engaging socket 18, which is internally threaded, the diameter of the socket 18 being such that it is adapted to engage a service pipe 19 of the size ordinarily employed.

20 represents a coupling nut, which is internally threaded to engage the external thread of the bushing 13, and is provided with an inwardly-projecting flange 21 adapted to bear on a shoulder 22 formed on the conduit section 16.

The coupling nut may be provided with a contracted neck portion 23, which surrounds the socket 18, and is provided with a polygonal external surface adapted to engage a wrench, the contracted portion 23 enabling the nut to be manipulated without the employment of a wrench of the large size that would be required to engage the perimeter of the body portion of the nut, the latter being of larger size than the bushing 13. If desired, however, the neck portion 23 may be omitted, the nut being formed to be engaged by a wrench or a spanner.

It will be seen that when the conduit section 16 and the nut 20 are not in place, the hand hole bushing provides for the convenient insertion of the hand and arm of an operator, or of a suitable tool, into the interior of the upper head and the corresponding portion of the body of the receptacle. Hence the operation of securing the head to which the hand hole bushing is applied may be conveniently performed. The socket portion 18 of the conduit section 16 enables a service pipe 19 to be connected with the receptacle, the reciprocal bearing faces 15 and 17 on the bushing and conduit section providing for a tight joint around the latter.

It is obvious that the described improvement may be applied to receptacles of various kinds and for various purposes, and that its use is not limited to receptacles of the character shown.

I claim:

1. An appliance of the character stated, comprising a hand hole bushing having an external member adapted for attachment to a receptacle head, a conduit section having one end enlarged, the said bushing and enlarged end having reciprocal bearing faces forming a tight joint, and means for detachably securing the section to the bushing.

2. An appliance of the character stated, comprising an externally threaded hand hole bushing having an external member adapted for attachment to a receptacle head, and a conduit section enlarged at one end and having a reduced pipe-engaging socket at its opposite end, the bushing and the enlarged end of the conduit section being provided with reciprocal bearing faces adapted to maintain a tight joint, and a coupling nut adapted to engage the external thread of the bushing and having an inwardly-projecting flange to engage the enlarged portion of the conduit section.

3. An appliance of the character stated, comprising an externally threaded hand hole bushing adapted for attachment to a receptacle head, and a conduit section enlarged at one end and having a reduced pipe-engaging socket at its opposite end, the bushing and the enlarged end of the conduit section being provided with reciprocal bearing faces adapted to maintain a tight joint, and a coupling nut adapted to engage the external thread of the bushing, and having an inwardly-projecting flange to engage the enlarged portion of the conduit section, said nut having a reduced wrench-engaging end surrounding said socket.

In testimony whereof I have affixed my signature, in presence of two witnesses.

ARTHUR C. BADGER.

Witnesses:
  C. F. BROWN,
  E. BATCHELDER.